US012600079B2

(12) United States Patent
Kruschel

(10) Patent No.: US 12,600,079 B2
(45) Date of Patent: Apr. 14, 2026

(54) DECORATIVE MOLDED PART AND METHOD OF MANUFACTURING THE SAME

(71) Applicant: JOYSONQUIN Automotive Systems GmbH, Rutesheim (DE)

(72) Inventor: Felix Kruschel, Weil der Stadt (DE)

(73) Assignee: JOYSONQUIN Automotive Systems GmbH, Rutesheim (DE)

( * ) Notice: Subject to any disclaimer, the term of this patent is extended or adjusted under 35 U.S.C. 154(b) by 419 days.

(21) Appl. No.: 18/120,196

(22) Filed: Mar. 10, 2023

(65) Prior Publication Data

US 2023/0294618 A1 Sep. 21, 2023

(30) Foreign Application Priority Data

Mar. 18, 2022 (DE) ......................... 102022106448.4

(51) Int. Cl.
| | |
|---|---|
| *B29C 53/04* | (2006.01) |
| *B29C 63/04* | (2006.01) |
| *B32B 3/04* | (2006.01) |
| *B32B 3/30* | (2006.01) |
| *B32B 5/18* | (2006.01) |
| *B32B 15/04* | (2006.01) |
| *B32B 15/20* | (2006.01) |

(Continued)

(52) U.S. Cl.
CPC .............. *B29C 53/04* (2013.01); *B29C 63/04* (2013.01); *B32B 3/04* (2013.01); *B32B 3/30* (2013.01); *B32B 5/18* (2013.01); *B32B 15/046* (2013.01); *B32B 15/20* (2013.01); *B32B 27/065* (2013.01); *B60R 13/0206* (2013.01); *B32B 2307/58* (2013.01); *B32B 2307/746* (2013.01)

(58) Field of Classification Search
CPC ................................ B29C 53/04; B29C 63/04
See application file for complete search history.

(56) References Cited

U.S. PATENT DOCUMENTS

| | | | | | |
|---|---|---|---|---|---|
| 4,385,090 | A | * | 5/1983 | Sims ........................ | B29C 63/04 |
| | | | | | 428/317.5 |
| 5,324,384 | A | * | 6/1994 | Spengler ................. | B29C 63/04 |
| | | | | | 156/227 |

(Continued)

FOREIGN PATENT DOCUMENTS

| | | |
|---|---|---|
| CN | 105563892 | 5/2016 |
| DE | 4301444 | 7/1994 |

(Continued)

OTHER PUBLICATIONS

Office Action in counterpart Chinese Patent application No. 202310258030.1 dated Jul. 17, 2025, 8 pages.

(Continued)

*Primary Examiner* — Atul P. Khare
(74) *Attorney, Agent, or Firm* — Fattibene and Fattibene, LLC; Paul A. Fattibene

(57) ABSTRACT

A decorative molded part with a decorative sheet provided on the visible side and is connected to a substrate, and to a method of manufacturing the same. In the method, a plastic layer is arranged between the substrate and the decorative sheet. Edge sections of the decorative sheet projecting beyond the substrate on both sides are bent around the substrate together with the plastic layer for positive enclosure of the substrate within the decorative sheet.

13 Claims, 1 Drawing Sheet

(51) Int. Cl.
    *B32B 27/06*          (2006.01)
    *B60R 13/02*          (2006.01)

(56)            References Cited

U.S. PATENT DOCUMENTS

| | | | |
|---|---|---|---|
| 6,929,711 B2 * | 8/2005 | Benninger | B29C 51/16 |
| | | | 156/212 |
| 8,889,574 B2 * | 11/2014 | Dolgopolsky | B32B 5/245 |
| | | | 442/373 |
| 2007/0042157 A1 * | 2/2007 | Dooley | B29C 63/04 |
| | | | 428/124 |
| 2016/0121522 A1 | 5/2016 | Mazur | B29C 44/12 |

FOREIGN PATENT DOCUMENTS

| | | |
|---|---|---|
| DE | 10216128 | 11/2003 |
| DE | 102013108702 | 2/2015 |
| JP | S59201814 | 11/1984 |
| JP | 2005178637 A * | 7/2005 |

OTHER PUBLICATIONS

German Search Report (Recherchebericht), in counterpart application No. 10 2022 106 448.4, dated Dec. 14, 2022, 7 pages.

\* cited by examiner

DECORATIVE MOLDED PART AND METHOD OF MANUFACTURING THE SAME

FIELD OF THE INVENTION

The present invention relates to a decorative molded part and a method of manufacturing the same. In particular, the invention relates to a decorative molded part which is used as an interior trim part in a motor vehicle.

BACKGROUND OF THE INVENTION

Such decorative parts are usually manufactured by means of multi-component injection molding. For example, a method known from DE 43 01 444 A1 discloses the insertion of a veneer as a decorative layer, which is back-molded with a plastic that forms a substrate of the decorative molded part on the rear side and is overmolded on the visible side with a transparent coating that is intended to protect the decorative layer from environmental influences. This method is generally known and common today. It offers the advantage that a decorative molded part, which may have previously been formed in three dimensions, can be essentially automated by means of injection molding and bonded to the substrate or protective layer, wherein the decorative molded part is basically produced finish-produced in one tooling step. Usually, only the contours on the outer periphery of the decorative molded part need to be reworked.

However, overmolding a plastic that is to adhere to a surface of the decorative layer sometimes involves special measures. For example, a veneer part is usually provided with a lamination on the rear side for reinforcement but also for bonding the plastic. In addition, the layers of the decorative molded part are materially bonded after manufacture, which makes it impossible to reuse the individual components of the decorative molded part.

SUMMARY OF THE INVENTION

The present invention is based on the problem of providing a decorative molded part and a method for its manufacture which permit the separation of individual components of the decorative molded part by type. The method according to the invention should nevertheless be easy and economical to carry out.

In order to solve the aspect of the present invention relating to the method, the present invention discloses a method of manufacturing a decorative molded part with the features recited in the claims.

In this context, the invention assumes that the decorative layer is formed by a decorative sheet. This decorative sheet can be a thin plate made of a plastic or metal. All that is required is a certain degree of bendability, wherein both hot forming and cold forming can be considered for implementing the present invention. The present invention proposes to positively enclose/embed the substrate within the decorative sheet. For this purpose, edge sections of the decorative sheet projecting beyond the substrate on both sides are first bent around the substrate so that the substrate is at least partially enclosed by the decorative sheet on opposite sides. These sides are regularly the main side surfaces of the substrate, i.e. those surfaces of the substrate which have the greatest areal extent. The surface sections extending essentially at right angles thereto and in any case connecting the main side surfaces are referred to as the periphery in the following description of the invention. The decorative molded part according to the present invention is formed like a conventional decorative molded part and thus is relatively thin. The decorative molded part can serve to cover the center console or the dashboard or side shelves on or in the door or the ceiling or roof lining within the cabin of the vehicle. The decorative molded part is thus an essentially flat, planar product. The decorative molded part may form the outer surface of a steering wheel.

The substrate or carrier of the decorative molded part usually is a plastic part, which may provide fixing sections for securing the decorative molded part to the body of a vehicle. Those fixing sections may be a unitarily formed securing projection and/or securing receptacle, which are formed by a plastic material providing the carrier and/or by bolts or nuts or other fixing elements, which may be integrally joined with the plastic body of the decorative molded part by overmolding. The fixing sections are made to interlock with mating surfaces of a part of the body of the vehicle or a component connected to the body of the vehicle.

Accordingly, the substrate also has a relatively large spatial extension with a very small thickness. The substrate is preferably used for mounting the decorative molded part on the vehicle. The substrate is preferably manufactured by injection molding. During injection molding, projections and other attachment elements are usually injection molded in one piece on the rear side of the substrate opposite the visible side of the decorative molded part. Connecting elements, such as screws or rivets, can also be attached to the substrate by overmolding.

In the present invention, a plastic layer is provided between the substrate and the decorative sheet. This plastic layer spaces the decorative sheet apart from the substrate. The plastic layer prevents direct contact between the decorative sheet and the substrate and thus prevents creaking due to friction of the decorative sheet against the rigid substrate. It is understood that the plastic layer is preferably formed from a relatively soft plastic, particularly preferably from a foamed plastic. The substrate, the plastic layer and the decorative sheet are usually made of identical materials. According to the present invention, the connection between the three components is usually made solely by bending the decorative sheet around the substrate while enclosing the plastic layer. The bent end sections not only positively accommodate the substrate within the three-dimensionally shaped decorative sheet, but also, in the same way, the plastic layer.

An adhesive joint or the like can be dispensed with. This means that the method can be carried out quickly and thus cost-effectively. For recycling of the individual components of the decorative molded part, only the bent edge sections have to be bent back or cut off. This frees up the substrate and also the plastic layer. The three parts can be recycled by type. This advantage can be achieved due to the absence of any adhesive/glue provided to connect the decorative sheet the substrate and/or the plastic layer with any other of the neighboring layers of the decorated molded part. Those layers are just provided next to each other before joining the connection by means of the positive locking.

During the manufacture of the decorative molded part, surface sections of the decorative sheet enclosing the substrate are usually covered with the plastic layer before the decorative sheet is bent. Accordingly, the plastic layer is only deposited on the decorative sheet, namely on a rear side of the decorative sheet opposite the visible side.

The decorative sheet and the plastic layer are preferably prepared before bending as essentially flat semi-finished products and placed one on top of the other. Aligned relative to each other in this form, the plastic layer and the decorative sheet are preferably punched to contour in a single operation. The base area of the decorative sheet thus corresponds to the base area of the plastic layer. The cutting/trimming of the two layers of the decorative molded part in one pass and are therefore cost-effective. As a result, the plastic layer and the decorative sheet are cut to the same contour, preferably by punching.

With regard to simple attachment of the decorative molded part to the motor vehicle, it is proposed in accordance with a preferred further development of the present invention to positively place, i.e. bend, the decorative sheet around the substrate, omitting at least one rear side surface section of the substrate. This rear side surface section is usually located in the central region of the substrate. The rear side surface section may include the aforementioned attachment pins, which are provided integrally on the substrate and are used to attach the decorative molded part to the motor vehicle. The preferred configuration ensures that at least a certain surface area of the substrate is exposed on the outside of the decorative molded part. In this case, the bent edge sections of the decorative sheet ensure that the decorative properties are also apparent on the periphery of the decorative molded part. However, the decorative molded part is not limited to this configuration. In principle, the substrate can be completely surrounded by the decorative sheet and/or the plastic layer. For the attachment of the three layers of the decorative molded part, however, it is sufficient if only certain segments of the respective edge sections of the decorative sheet, which project beyond the main side surface of the substrate before bending, are placed around the substrate. In this configuration, the substrate is only partially surrounded by the decorative sheet. The plastic layer preferably follows the shape of the decorative sheet and is only provided where the decorative sheet and the substrate enclose a gap between them.

With a view to good stabilization of the layer of decorative sheet and substrate, it is preferable to make the plastic layer from a foamed plastic. Such a configuration also improves the anti-creaking effect of the plastic layer.

The decorative molded part is to be arranged within a cabin of a vehicle. The decorative molded part has a decorative sheet on the visible side and a substrate connected thereto. The substrate is spaced apart from the decorative sheet via a plastic layer. The substrate is positively accommodated and fixed within the decorative sheet via flanged edge sections of the decorative sheet.

Further details and advantages will be apparent from the following description of an embodiment in conjunction with the drawing. Therein:

DETAILED DESCRIPTION OF THE PREFERRED EMBODIMENTS

Figure 1:
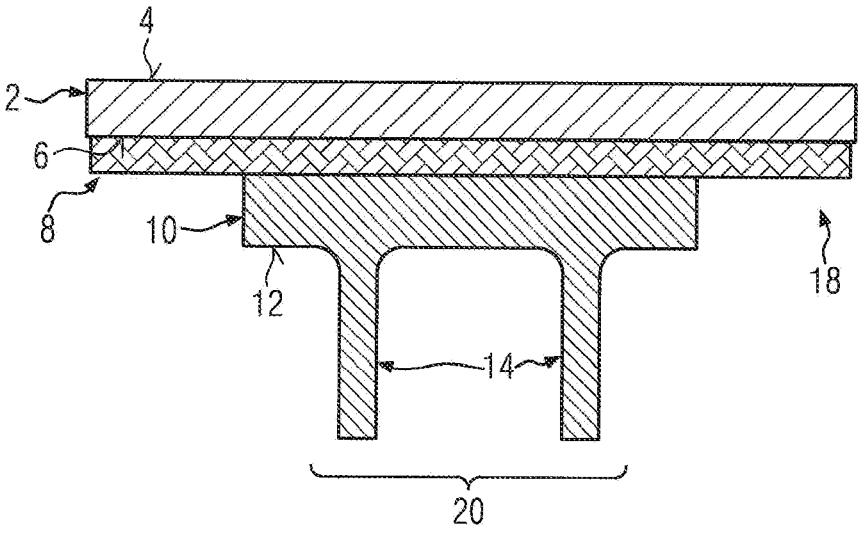
FIG. 1 shows a schematic sectional view of the individual layers of the decorative molded part before joining.

In FIG. 1, reference sign 2 characterizes a decorative sheet, in this case made of aluminum. The decorative sheet 2 has a visible side 4 and a rear side 6. The visible side 4 can be pretreated. For example, an embossing or pattern can be provided on the visible side 4 of the decorative sheet 2. The decorative sheet 2 can also have through-holes punched in the decorative sheet 2, so that a top view of the visible side also shows a plastic layer characterized by reference sign 8, which in this case also has decorative properties. In this case, a further decorative layer, for example a plastic film or a veneer, can also be underlaid on the decorative sheet 2, which can be seen through the through-holes from the visible side.

The plastic layer 8 serves at least as a spacer so that a substrate characterized by reference sign 10 does not directly contact the decorative sheet 2. The plastic layer 8 is usually formed from a plastic foam. If the decorative sheet 2 is underlaid with the further decorative layer, the elastic properties of the plastic foam can be adjusted in such a way that they force the further decorative layer outward through the through-holes so that, if necessary, they come to lie on the same plane as the visible side of the decorative sheet.

The substrate is manufactured by injection molding. It can be formed from a plastic, such as PC or ABS. The substrate 10 has attachment pins 14 extending from a rear side 12 of the substrate 10 and integrally formed thereon by injection molding. The attachment pins 14 are arranged at a distance from a peripheral edge of the substrate 10.

For manufacture, the decorative sheet 2 and the plastic layer 8 are placed on top of each other. Both layers are then punched so that they have the same contour. The separately prepared substrate 10 is then applied against the plastic layer 8 on the side facing away from the decorative sheet 2.

Figure 2:
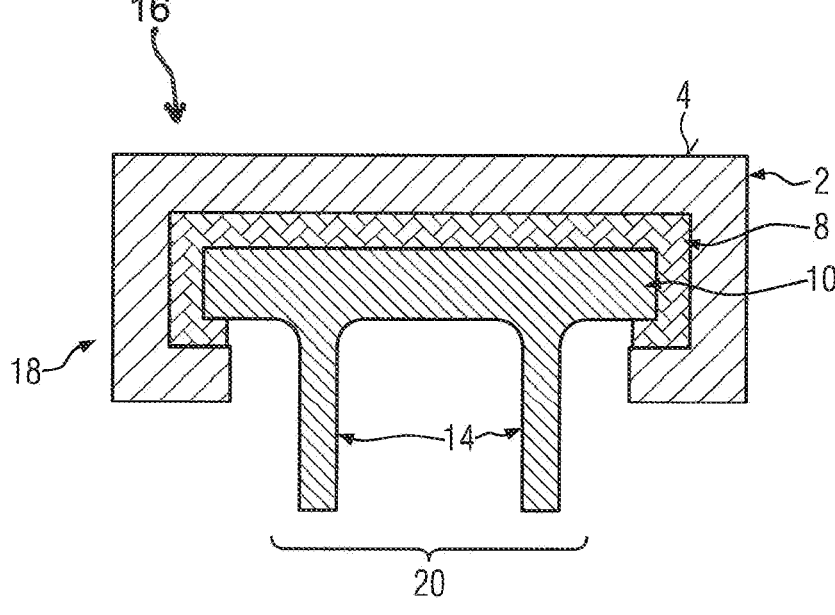
FIG. 2 shows the sectional view according to FIG. 1 after joining.

Edge sections characterized by reference sign 18 in FIG. 2 are then bent over. Bending the decorative sheet 2 causes the plastic layer 8 to be carried along and placed against the outside of the substrate 10 (see FIG. 2). The edge sections 18 circumferentially delimit the substrate 10. In addition, the edge sections 18 are bent inwardly beyond the periphery of the substrate 10. Thus, the edge sections 18 with their free ends at least partially project beyond the rear side 12 of the substrate 10. Dimensioning of the decorative sheet 2 and the plastic layer 8 is carried out with regard to the dimensions of the substrate 10 in such a way that a rear surface section characterized by reference sign 20 remains free at the rear side of the decorative molded part 16. The fastening pins 14, which also project beyond the decorative sheet 2 at the rear side of the decorative molded part 16, project from this rear surface section 20 (cf. FIG. 2).

As FIG. 2 shows, the substrate 10 is thus positively surrounded by the decorative sheet 2. In the same way, the plastic layer 8 is also positively received by the contact decorative sheet 2 between the latter and the substrate 10. The plastic layer 8 prevents direct contact between the contact decorative sheet 2 and the substrate 10 and then creaking due to friction between the two parts.

Since the plastic layer 8 is formed by a plastic foam, this can easily evade compressive stress. Even when processing a fairly thin decorative sheet 2, bending is accordingly not disturbed by a counterforce from the inside which could be generated by the plastic layer 8. Thus, the decorative sheet 2 can be bent into the desired shape by machining on the outside of the decorative sheet 2 and shaped into its final form. This also results in a close bond between individual layers, since the substrate 10 can also be pressed into the plastic layer 8 at points or in sections.

The invention permits the use of different materials for the manufacture of a decorative molded part 16. Adhesion properties of these materials to one another are not important. The materials are preferably connected to each other with positive locking along by bending the decorative sheet 2. Bending back the decorative sheet 2 allows the individual components of the decorative molded part 16 to be separated by type and thus the materials to be returned to the material cycle.

LIST OF REFERENCE SIGNS

2 decorative sheet
4 visible side
6 rear side
8 plastic layer
10 substrate
12 rear side
14 attachment pin
16 decorative molded part
18 edge section
20 rear surface section

What is claimed is:

1. A method of manufacturing a decorative molded part with a decorative sheet on a visible side of the decorative molded part and connected to a substrate, comprising the steps of:
   arranging a plastic layer between the substrate and the decorative sheet, wherein edge sections of the decorative sheet project beyond the substrate on both sides thereof; and
   bending the edge sections around the both sides of the substrate enclosing the plastic layer to form a positive enclosure of the substrate within the decorative sheet, wherein the substrate and the plastic layer are connected to each other exclusively by the positive enclosure, the substrate is injection molded as a molded part, and the substrate is formed from a foamed plastic.

2. The method according to claim 1, wherein surface sections of the decorative sheet are covered with the plastic layer before said step of bending the edge sections.

3. The method according to claim 2, wherein the decorative sheet and the plastic layer are placed one on top of the other as flat semi-finished products and cut to contour before said step of bending the edge sections.

4. The method according to claim 3, wherein the plastic layer and the decorative sheet are cut to the same contour.

5. The method according to claim 1, wherein at least one rear side surface section of the substrate is omitted from said step of bending the edge sections.

6. The method according to claim 1, wherein the substrate is at least partially surrounded by the decorative sheet by said step of bending the edge sections.

7. The method according to claim 1, wherein the substrate is at least partially surrounded by the decorative sheet and the plastic layer by said step of bending the edge sections.

8. The method according to claim 1, wherein the substrate is at least partially surrounded by the plastic layer by said step of bending the edge sections.

9. The method according to claim 1, wherein the plastic layer is formed from a foamed plastic.

10. The method according to claim 1, wherein the substrate and the plastic layer are connected to each other and to the decorative sheet exclusively by the positive enclosure.

11. A method of manufacturing a decorative molded part comprising the steps of:
   forming a foamed plastic substrate having a periphery and a front side and a rear side by injection molding, the rear side having attachment pins;
   placing a decorative sheet on a plastic layer;
   punching the decorative sheet and the plastic layer forming a contour having edge sections;
   applying the decorative sheet and the plastic layer of the contour to the substrate with the plastic layer between the decorative sheet and the substrate and the edge sections of the contour extending beyond at least opposing ends of the periphery of the substrate; and
   bending the edge sections of the decorative sheet and the plastic layer of the contour over the periphery of the substrate from the front side to the rear side forming a positive enclosure of the substrate with the decorative sheet and the plastic layer of the contour wherein the decorative sheet is fixed to the substrate by the edge sections of the contour, wherein the substrate and the plastic layer are connected to each other exclusively by the positive enclosure,
   whereby the substrate, decorative sheet, and the plastic layer a capable of being easily separated for cost-effective recycling.

12. The method of manufacturing a decorative molded part according to claim 11 wherein:
   the plastic layer comprises foam.

13. The method of manufacturing a decorative molded part according to claim 11 wherein:
   the decorative sheet comprises aluminum.

\* \* \* \* \*